Patented Jan. 27, 1925.

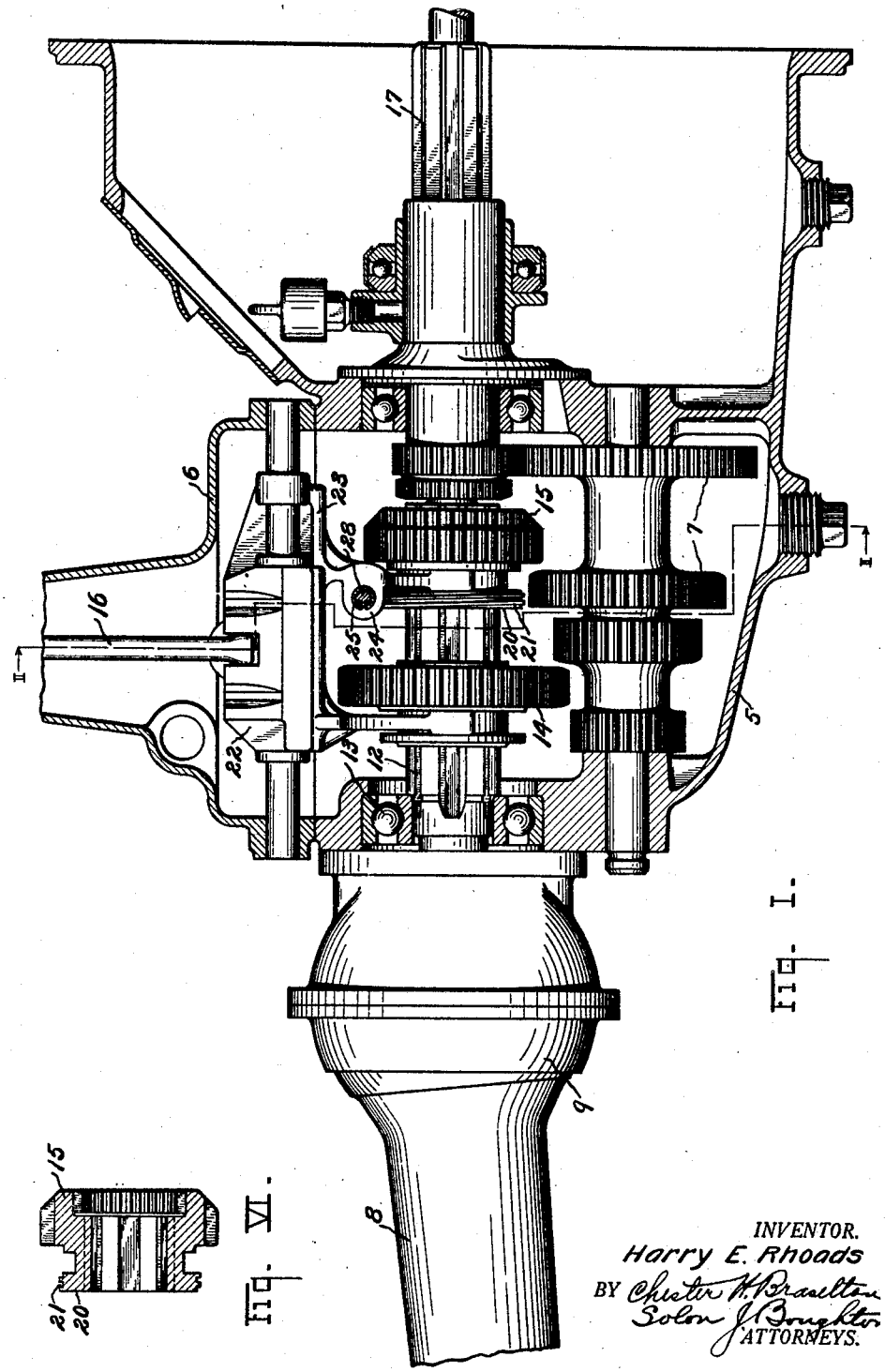

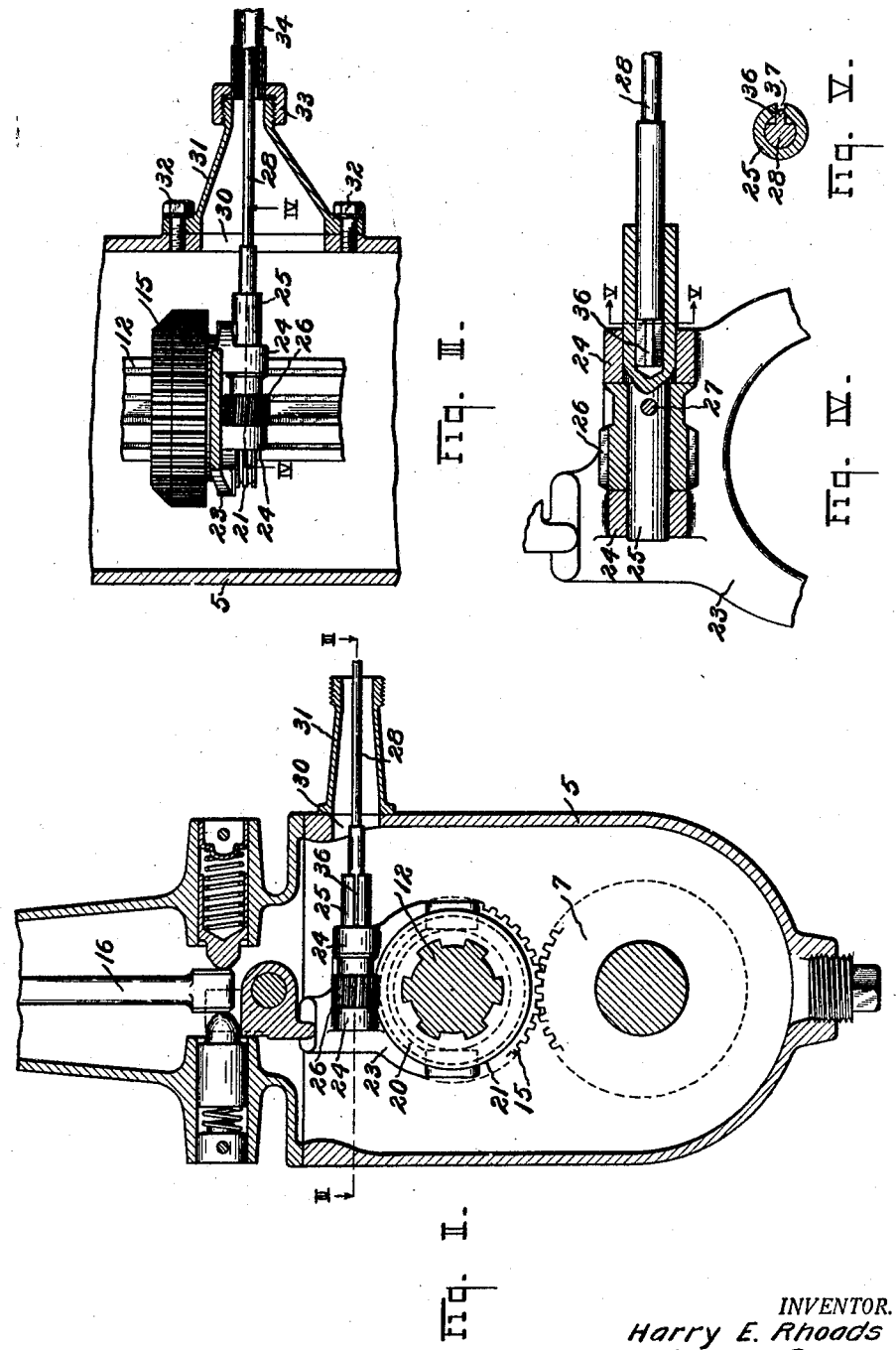

1,524,151

UNITED STATES PATENT OFFICE.

HARRY E. RHOADS, OF TOLEDO, OHIO.

SPEEDOMETER DRIVE GEAR.

Application filed June 24, 1922. Serial No. 570,647.

*To all whom it may concern:*

Be it known that I, HARRY E. RHOADS, a citizen of the United States, residing at Toledo, Ohio, county of Lucas, have invented certain new and useful Improvements in Speedometer Drive Gears, of which I declare the following to be a full, clear, and exact description.

This invention relates to the drive gear of a speedometer or odometer for an automotive vehicle.

An object of invention is the provision of a simple and efficient drive connection between such a meter and the drive shaft of the vehicle.

Another object is the elimination in such a connection of a separately attached gear member and the adaptation rather of a part already employed in the usual vehicle drive mechanism.

Other objects and objects relating to details of construction and economies of manufacture will appear as I proceed with the description of that embodiment of the invention which, for the purposes of the present application, I have illustrated in the accompanying drawing, in which:

Figure I is a vertical cross sectional view of the gear case and a portion of the crank case of an internal combustion engine driven vehicle showing a common form of change speed gearing and my invention applied thereto.

Fig. II is a vertical cross sectional view of the gear casing taken on line II—II of Fig. I.

Fig. III is a horizontal cross sectional view of the gear casing taken on the line III—III of Fig. II.

Fig. IV is a sectional view on the line IV—IV of Fig. III showing one of the shifter forks and the worm gear and shaft carried thereby.

Fig. V is a cross sectional view on line V—V of Fig. IV and

Fig. VI is a cross sectional view of the gear which carries the worm for operating the speedometer or odometer.

Throughout the drawings the same reference numbers refer to similar parts, and the sectional views are taken in the directions indicated by the arrows at the ends of the section lines.

Referring now to the drawings, there is shown a transmission case 5 supporting a gear shift housing 6 and containing a set of counter shaft gears 7, the housing being connected at its forward end with the engine crank case and at its rear end with a torsion tube 8 by means of a universal joint 9, such being a common construction of internal combustion engine driven vehicles. A splined power transmission shaft 12 mounted on ball bearings 13 carries two slidable gears 14 and 15 which are adapted to be actuated by means of a gear shift handle 16 in the usual and well known manner for obtaining various speed ratios between the engine shaft 17 and the transmission shaft 12.

Both gear wheels 14 and 15 are provided with axial extensions, each terminating in a radial flange which, with the body of the gear, forms a concentric annular channel for receiving the ends of the corresponding shifting fork. The flange 20 of the gear 15 is shown somewhat wider than the corresponding flange of the gear 14 and has formed on its periphery a worm 21. The gear shift fork 22 for the gear 14 is shown of the usual construction. The gear shift fork 23 for the gear 15 however is modified to the extent that it is provided with a pair of lugs 24 which form bearings for a small counter shaft 25 lying in the plane of the worm 21. Between the lugs 24 a worm wheel 26 is secured to the countershaft 25 by means of a pin 27, which worm wheel meshes with the worm 21. In order to connect the countershaft 25 with a speedometer, odometer or a like device (not shown) for indicating the movement of the vehicle, the counter shaft 25 has a flexible portion 28 extending out through an elongated opening 30 in the gear case 5. A housing 31 of a shape to conform to the opening 30 and tapered is attached to the exterior of the gear case by bolts 32 and at its outer end has a nipple 33 for securing an armored case 34 for the flexible portion of the countershaft. A quickly detachable connection between the two parts of the countershaft is provided by the means illustrated in Figs. IV and V where a spline 36 in one part engages a spline groove 37 in the other.

By the above described construction it will be observed that the use of an additional gear element for driving a speedometer countershaft is avoided and, instead, worm teeth are formed upon a flange of the gear 15. It is to be noted however that the worm 21 might be formed equally well on the gear 14 rather than on the gear 15 in which case the countershaft 25 would be journalled in the shifting fork for gear 14. The countershaft 25 carrying the worm wheel 26 being journalled in shifting fork 23 always moves with the gear 15 and worm 21 and since this gear is splined to the shaft 12 its rotation corresponds with that of the rear wheels. The flexible shaft 28 is free to move laterally through the opening in the gear casing while the housing 31 prevents the entrance of dust and dirt therein. The nipple 33 on the outer end of the housing serves to anchor the corresponding end of the armored case of the flexible shaft.

Although the countershaft 25 is herein shown as arranged horizontally, this is for illustrative purposes merely, as such shaft may be mounted at any desired angle or vertically if preferred While I have shown and described in considerable detail a specific embodiment of my invention, it is to be understood that this showing and description is illustrative only and for the purpose of rendering my invention more clear, and that I do not regard the invention as limited to the precise details of construction illustrated or described except insofar as I have included such limitations with the terms of the following claims, in which it is my intention to claim all novelty inherent in my invention broadly as well as specifically.

What I claim as new and desire to secure by Letters Patent is:—

1. In an automotive vehicle having a change speed gearing comprising a slidable gear and means for sliding said gear, a countershaft carried by said means, and means for rotating said countershaft from said gear.

2. In an automotive vehicle having a change speed gearing comprising a slidable gear and means for sliding said gear, a countershaft carried by said means, a gear on said countershaft and a gear on said slidable gear in mesh therewith.

3. In an automotive vehicle having a change speed gearing comprising a power transmission shaft, a gear slidable thereon and a shifting fork for said gear, a countershaft journalled in said shifting fork and cooperating means on said countershaft and said gear for transmitting rotative movement 4. In an automotive vehicle having a gear shift mechanism comprising a slidable gear, a flexible shaft, means for operatively connecting said flexible shaft with said slidable gear and means for sliding said gear and shaft.

5. In an automotive vehicle having a gear shift mechanism comprising a slidable gear and a shifter member therefor, a flexible shaft, and means carried jointly by said shifter member and said gear for rotating said flexible shaft.

6 In a gear shift mechanism comprising a shifting device and a gear member having an axial extension terminating in a flange for engaging said shifting device, gear teeth formed on said flange, a countershaft carried by said shifting device, and a gear on said countershaft for engaging said gear teeth.

7 In a gear shift mechanism comprising a shifting device and a gear member having an integral radial flange spaced from the body of said gear member forming therewith an annular channel to receive said shifting device, gear teeth formed on the periphery of said flange, and a countershaft and cooperating gear carried by said shifting device 8. In an automotive vehicle, a gear shift mechanism comprising a slidable gear, a shaft adapted to be driven from and slidable with said gear, and a casing for said mechanism having an elongated opening through which said shaft extends.

9. In an automotive vehicle, a gear shift mechanism comprising a slidable gear, a countershaft having a flexible portion and adapted to be driven from and slidable with said gear, a casing for said mechanism having a slot for said countershaft, a housing covering said opening and a part of said flexible portion and means on the outer end of said housing for engaging a covering on said flexible portion.

10 In an automotive vehicle, a change speed mechanism including a shiftable transmission gear, a second gear connected with said transmission gear, a flexible shaft operatively connected with said second gear, and common means for simultaneously shifting both of said gears.

In testimony whereof, I affix my signature.

HARRY E. RHOADS.